(12) United States Patent
Choi

(10) Patent No.: US 12,402,767 B2
(45) Date of Patent: Sep. 2, 2025

(54) METHOD FOR CONTROLLING ROBOT CLEANER

(71) Applicant: LG ELECTRONICS INC., Seoul (KR)

(72) Inventor: Byoungsuk Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 383 days.

(21) Appl. No.: 18/013,430

(22) PCT Filed: Oct. 6, 2020

(86) PCT No.: PCT/KR2020/013543
§ 371 (c)(1),
(2) Date: Dec. 28, 2022

(87) PCT Pub. No.: WO2022/004949
PCT Pub. Date: Jan. 6, 2022

(65) Prior Publication Data
US 2023/0248203 A1 Aug. 10, 2023

(30) Foreign Application Priority Data
Jul. 2, 2020 (KR) .................. 10-2020-0081415

(51) Int. Cl.
*A47L 11/40* (2006.01)
*G05D 1/00* (2024.01)

(52) U.S. Cl.
CPC ........ *A47L 11/4011* (2013.01); *G05D 1/0225* (2013.01); *G05D 1/0238* (2013.01);
(Continued)

(58) Field of Classification Search
CPC ............. A47L 11/4011; A47L 2201/02; A47L 2201/022; A47L 2201/04; A47L 2201/06;
(Continued)

(56) References Cited

U.S. PATENT DOCUMENTS 11,199,853 B1 * 12/2021 Afrouzi .................. B25J 13/006
11,274,929 B1 * 3/2022 Afrouzi .................... G06T 7/30
(Continued)

FOREIGN PATENT DOCUMENTS

JP 2008-181177 A 8/2008
KR 10-2004-0081629 A 9/2004
(Continued)

*Primary Examiner* — Sohana Tanju Khayer
(74) *Attorney, Agent, or Firm* — Birch, Stewart, Kolasch & Birch, LLP

(57) ABSTRACT

The present disclosure relates to a method for controlling a robot cleaner and, more particularly, to a method for controlling a robot cleaner including a plurality of obstacle detection sensors, the method for controlling the robot cleaner to execute the operations comprising: a first step for approaching a charging device for the robot cleaner according to an IR signal transmitted from the charging device for the robot cleaner including a charging terminal for charging the robot cleaner; a second step for checking whether the shortest distance between the robot cleaner and the charging device for the robot cleaner is less than or equal to a first distance through the plurality of obstacle detection sensors; a third step for checking whether the center lines of the robot cleaner and the charging device for the robot cleaner are aligned through the plurality of obstacle detection sensors, and aligning the center lines of the robot cleaner and the charging device for the robot cleaner; and a fourth step for, when the center lines of the robot cleaner and the charging device for the robot cleaner have been aligned, moving the robot cleaner straight toward the charging device for the robot cleaner.

17 Claims, 11 Drawing Sheets

(52) U.S. Cl.
CPC ........ *G05D 1/0242* (2013.01); *A47L 2201/02* (2013.01); *A47L 2201/022* (2013.01); *A47L 2201/04* (2013.01); *A47L 2201/06* (2013.01)

(58) Field of Classification Search
CPC .. A47L 9/2852; A47L 11/4061; A47L 9/2805; A47L 9/2873; G05D 1/0225; G05D 1/0238; G05D 1/0242
See application file for complete search history.

(56) References Cited

U.S. PATENT DOCUMENTS

| | | | |
|---|---|---|---|
| 2007/0271011 A1* | 11/2007 | Lee | G05D 1/028 901/1 |
| 2012/0296511 A1 | 11/2012 | More et al. | |
| 2016/0271795 A1* | 9/2016 | Vicenti | G05D 1/644 |
| 2017/0344014 A1* | 11/2017 | Wu | G05D 1/0225 |
| 2019/0121361 A1* | 4/2019 | Afrouzi | G01C 21/206 |
| 2019/0196489 A1* | 6/2019 | Xiong | G05D 1/0225 |
| 2020/0004263 A1* | 1/2020 | Dalla Libera | G01S 7/4808 |
| 2020/0030982 A1* | 1/2020 | Xiong | G05D 1/0242 |
| 2020/0093342 A1* | 3/2020 | Jeong | A47L 11/4005 |
| 2020/0150676 A1* | 5/2020 | Huang | G05D 1/0236 |
| 2021/0146552 A1* | 5/2021 | Hong | A47L 9/2852 |
| 2022/0129002 A1* | 4/2022 | Li | G05D 1/0274 |
| 2022/0374022 A1* | 11/2022 | Chen | G05D 1/0225 |
| 2023/0030855 A1* | 2/2023 | Lundkvist | G05D 1/0265 |

FOREIGN PATENT DOCUMENTS

| | | |
|---|---|---|
| KR | 10-2010-0136904 A | 12/2010 |
| KR | 10-1080366 B1 | 11/2011 |
| KR | 10-2016-0097051 A | 8/2016 |
| KR | 10-2018-0079054 A | 7/2018 |

* cited by examiner (a)

(b)

(c)

(a)

(b)

METHOD FOR CONTROLLING ROBOT CLEANER

CROSS REFERENCE TO RELATED APPLICATIONS

This application is the National Phase of PCT International Application No. PCT/KR2020/013543, filed on Oct. 6, 2020, which claims priority under 35 U.S.C. 119 (a) to Patent Application No. 10-2020-0081415, filed in the Republic of Korea on Jul. 2, 2020, all of which are hereby expressly incorporated by reference into the present application.

TECHNICAL FIELD

The present disclosure relates to a control method of a robot cleaner. More particularly, the present disclosure relates to a control method of a robot cleaner for performing a proximity docking operation using an obstacle detection sensor.

BACKGROUND ART

In general, a robot cleaner is a cleaning device that sucks dust and a foreign substance from a floor surface while traveling a certain range of work areas without user manipulation, and a cleaning work is performed by determining the position of an obstacle or a wall through a sensor, a camera, or the like and avoiding the obstacle and the wall using the determined information while the robot cleaner travels.

After the cleaning work is performed, the robot cleaner moves to a robot cleaner charging device for charging, and according to a conventional robot cleaner control method, the robot cleaner receives an IR signal transmitted from the robot cleaner charging device and moves.

In this regard, Korean Patent Publication 20100136904 A (hereinafter referred to as Cited Reference 1) discloses a control method for detecting the position of a robot cleaner using three IR LEDs and inducing the robot cleaner to approach the center of a charging device for the robot cleaner, but since the robot cleaner control method using the IR signal is greatly affected by indoor lighting, sunlight, etc., it is difficult to control a detailed operation of the robot cleaner, and the intensity of the IR signal has the maximum intensity and it is impossible to distinguish a specific area of the robot cleaner charging device in a state in which the robot cleaner and the robot cleaner charging device are close to each other, and accordingly, there is a disadvantage in that docking for charging the robot cleaner and the robot cleaner charging device is not precisely performed.

Korean Patent Publication 20180079054 A (hereinafter referred to as Cited Reference 2) discloses that the robot cleaner is docked to the robot cleaner charging device at a close distance through the patterns and the 3D sensor by applying black and white color patterns to a front surface of a robot cleaner charging device and applying a 3D sensor including an IR line laser and a camera to the robot cleaner. However, in the Cited Reference 2, since the 3D sensor applied to the robot cleaner requires high cost and the patterns need to be applied to all front surfaces of the robot cleaner charging device, inefficient cost expenditure is disadvantageously required.

DISCLOSURE

Technical Problem

One of various objects of the present disclosure is to provide a control method of controlling a detailed operation using an obstacle detection sensor.

Technical Solution

According to exemplary embodiments of the present disclosure, a control method of a robot cleaner includes a first operation in which a robot cleaner including a plurality of obstacle detection sensors approaches the robot cleaner charging device according to an IR signal transmitted from a charging terminal for charging the robot cleaner, a second operation of checking whether a shortest distance between the robot cleaner and the robot cleaner charging device is equal to or less than a first distance, a third operation of checking whether center lines of the robot cleaner and the robot cleaner charging device are aligned through the plurality of obstacle detection sensors and aligning the center lines of the robot cleaner and the robot cleaner charging device, and a fourth operation in which the robot cleaner moves straight toward the robot cleaner charging device when the center lines of the robot cleaner and the robot cleaner charging device are aligned.

The control method of the robot cleaner may further include a fifth operation of checking whether the minimum distance between the robot cleaner and the robot cleaner charging device is equal to or less than a second distance smaller than the first distance in a state in which the center lines of the robot cleaner and the robot cleaner charging device are aligned, a sixth operation of checking whether a difference in direction angle occurs between the robot cleaner and the robot cleaner charging device through the plurality of obstacle detection sensors and correcting the difference in direction angle between the robot cleaner and the robot cleaner charging device, and a seventh operation in which the robot cleaner and the charging terminal come into contact when direction angles of the robot cleaner and the robot cleaner charging device are corrected.

According to exemplary embodiments of the present disclosure, a control method of a robot cleaner includes a first operation in which the robot cleaner including a plurality of obstacle detection sensors approaches the robot cleaner charging device according to an IR signal transmitted from a robot cleaner charging device including a charging terminal for charging the robot cleaner, a second operation of checking whether a shortest distance between the robot cleaner and the robot cleaner charging device is equal to or less than a first distance through the plurality of obstacle detection sensors, a third operation of checking whether center lines of the robot cleaner and the robot cleaner charging device are aligned through the plurality of obstacle detection sensors and aligning the center lines of the robot cleaner and the robot cleaner charging device, and a fourth operation in which the robot cleaner moves straight toward the robot cleaner charging device when the center lines of the robot cleaner and the robot cleaner charging device are aligned.

In the third operation, whether the center lines of the robot cleaner and the robot cleaner charging device are aligned may be determined through a distance measurement value of an obstacle detection sensor that detects a position of the robot cleaner charging device and a distance measurement value of an obstacle detection sensor that does not detect the position of the robot cleaner charging device.

In the third operation, when a distance measurement value of an obstacle detection sensor adjacent to an obstacle detection sensor that detects a position of the robot cleaner charging device is greater than a distance measurement value of the obstacle detection sensor that detects the position of the robot cleaner charging device, one end of the robot cleaner charging device is determined to be located between the obstacle detection sensors, and a center separation distance between the center line of the robot cleaner and the center line of the robot cleaner charging device may be estimated based on a position of the one end of the robot cleaner charging device through a 2D Cartesian coordinate system using a center of the robot cleaner as an origin.

In the third operation, when an absolute value of the center separation distance is smaller than a specific value, the center lines of the robot cleaner and the robot cleaner charging device may be determined to be aligned, and when the absolute value of the center separation distance is greater than the specific value, the center lines of the robot cleaner and the robot cleaner charging device may be determined not to be aligned.

In the third operation, when a value of the center separation distance is a positive value, the robot cleaner may be determined to be located to a left from the center line of the robot cleaner charging device, and when the value of the center separation distance is a negative value, the robot cleaner may be determined to be located to a right from the center line of the robot cleaner charging device.

The plurality of obstacle detection sensors may include a pair of first obstacle detection sensors for detecting a side obstacle, and a second obstacle detection sensor disposed between the pair of first obstacle detection sensors and provided to detect a forward obstacle, and in the third operation, whether the center lines of the robot cleaner and the robot cleaner charging device are aligned may be determined according to whether the first obstacle detection sensor and the second obstacle detection sensor detect the robot cleaner charging device.

In the third operation, a state in which only the second obstacle detection sensor among the plurality of obstacle detection sensors detects the robot cleaner charging device may be determined as a state in which the center lines of the robot cleaner and the robot cleaner charging device are aligned In the third operation, a state in which at least one first obstacle detection sensor among the pair of first obstacle detection sensors detects the robot cleaner charging device may be determined as a state in which the enter lines of the robot cleaner and the robot cleaner charging device are determined not to be aligned.

In the third operation, a state in which only the first obstacle detection sensor disposed on a right among the pair of first obstacle detection sensors detects the robot cleaner charging device may be determined as a state in which the center line of the robot cleaner is spaced apart from the center line of the robot cleaner charging device to a left.

In the third operation, when the center line of the robot cleaner is determined to be spaced apart from the center line of the robot cleaner charging device to the left, the robot cleaner may move to a right.

In the third operation, a state in which only the first obstacle detection sensor disposed on a left among the pair of first obstacle detection sensors detects the robot cleaner charging device may be determined as a state in which the center line of the robot cleaner is spaced apart from the center line of the robot cleaner charging device to a right.

In the third operation, when the center line of the robot cleaner is determined to be spaced apart from the center line of the robot cleaner charging device to the right, the robot cleaner may move to a left.

The method may further include a fifth operation of checking whether the shortest distance between the robot cleaner and the robot cleaner charging device is equal to or less than a second distance smaller than the first distance in a state in which the center lines of the robot cleaner and the robot cleaner charging device are aligned, a sixth operation of checking whether a difference in direction angle occurs between the robot cleaner and the robot cleaner charging device through the plurality of obstacle detection sensors and correcting the difference in the direction angle between the robot cleaner and the robot cleaner charging device, and a seventh operation in which in which the robot cleaner and the charging terminal come into contact when direction angles of the robot cleaner and the robot cleaner charging device are corrected.

In the sixth operation, whether the difference in direction angle occurs between the robot cleaner and the robot cleaner charging device may be determined using a smallest distance measurement value among distance measurement values of obstacle detection sensors that detect a position of the robot cleaner charging device and a distance measurement value closest to the smallest distance measurement value.

The plurality of obstacle detection sensors include a pair of first obstacle detection sensors for detecting a side obstacle, and a second obstacle detection sensor disposed between the pair of first obstacle detection sensors and provided to detect a forward obstacle, and in sixth operation, whether the difference in direction angle occurs between the robot cleaner and the robot cleaner charging device may be determined according to whether at least one of the pair of first obstacle detection sensors detects the robot cleaner charging device.

In the sixth operation, a state in which only the first obstacle detection sensor disposed on a right among the pair of first obstacle detection sensors detects the robot cleaner charging device may be determined as a state in which the difference in direction angle in a counterclockwise direction occurs between the robot cleaner and the center line of the robot cleaner charging device by a specific angle.

In the sixth operation, when the difference in direction angle in the counterclockwise direction is determined to occur between the robot cleaner and the center line of the robot cleaner charging device by the specific angle, the robot cleaner may rotate in a clockwise direction to correct the difference in direction angle.

In the sixth operation, only the first obstacle detection sensor disposed to a left among the pair of first obstacle detection sensors detects the robot cleaner charging device may be determined as a state in which the difference in direction angle in a clockwise direction occurs between the robot cleaner and the center line of the robot cleaner charging device by a specific angle.

In the sixth operation, when the difference in direction angle in the clockwise direction is determined to occur between the robot cleaner and the center line of the robot cleaner charging device by the specific angle, the robot cleaner may rotate in a counterclockwise direction to correct the difference in direction angle.

Advantageous Effects

In a control method of a robot cleaner according to exemplary embodiments of the present disclosure, remote docking of a robot cleaner including an obstacle detection sensor may be performed according to an IR signal generated from a robot cleaner charging device, and then short-distance docking of the robot cleaner may be additionally performed through the obstacle detection sensor in a state in which the robot cleaner is close to the robot cleaner charging device.

Short-distance docking of the robot cleaner through the obstacle detection sensor may not be affected by external environments, such as indoor lighting and sunlight, and a disadvantage that it is difficult to distinguish a specific area of the robot cleaner charging device according to the maximum intensity of the IR signal may be overcome. Accordingly, short-distance docking for charging the robot cleaner and the robot cleaner charging device may be precisely performed.

BEST MODE

Hereinafter, specific embodiments of the present disclosure will be described with reference to the drawings. The following detailed description is provided to provide a comprehensive understanding of the methods, apparatus, and/or systems described herein. However, this is merely an example and the present disclosure is not limited thereto.

In the following description of the present disclosure, a detailed description of known technology incorporated herein will be omitted when it may make the subject matter of the present disclosure unclear. The terms used in the specification are defined in consideration of functions used in the present disclosure, and may be changed according to the intent or conventionally used methods of clients, operators, and users. Accordingly, definitions of the terms should be understood on the basis of the entire description of the present specification. The terminology used herein is for the purpose of describing particular embodiments only and is not intended to be limiting of the present disclosure. As used herein, unless explicitly used otherwise, expressions in the singular include the meaning of the plural. In this description, expressions such as "comprising" or "including" are intended to indicate certain features, numbers, steps, operations, elements, some or a combination thereof, and but do not preclude the presence or addition of one or more other features, numbers, steps, operations, elements, some or a combination thereof.

It will be understood that, although the terms first, second, A, B, (a), (b), etc. may be used herein to describe various elements of the present disclosure, these terms are only used to distinguish one element from another element and essential, order, or sequence of corresponding elements are not limited by these terms.

Figure 1:
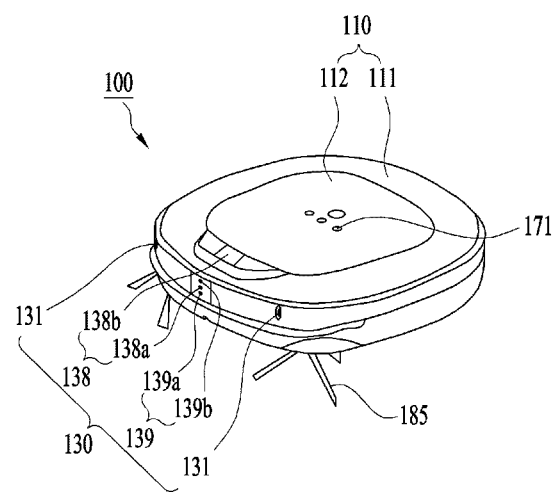
FIGS. 1 and 2 are diagrams for explaining a robot cleaner according to an embodiment of the present disclosure.
Figure 2:
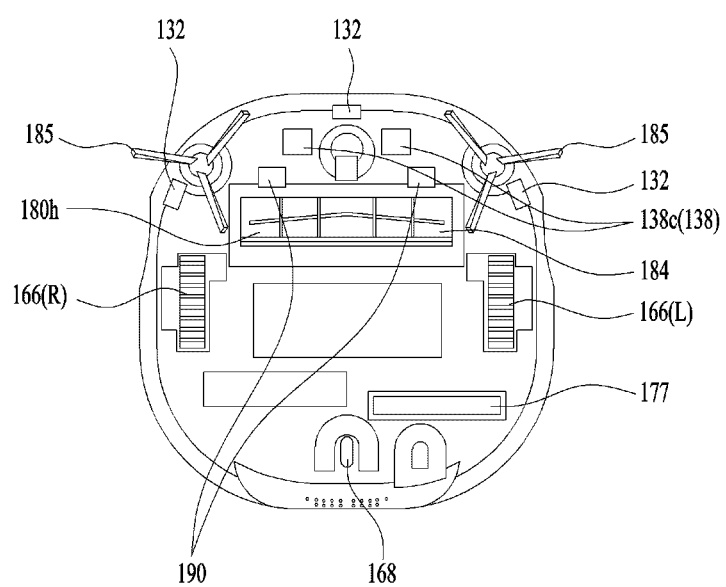

FIGS. 1 and 2 are diagrams for explaining a robot cleaner according to an embodiment of the present disclosure. In more detail, FIG. 1 is a perspective view for explaining an overall appearance of the robot cleaner. FIG. 2 is a bottom view for explaining a lower structure of a robot cleaner.

Referring to FIGS. 1 and 2, a robot cleaner 100 may include a main body 110. Hereinafter, in defining each part of the main body 110, a part facing a ceiling in a traveling area is defined as an upper surface part, a part facing the floor in the traveling area is defined as a bottom surface part, and a part facing a traveling direction of parts constituting a circumference of the main body 110 between the upper surface part and the lower surface part is defined as a front part. In addition, a part facing an opposite direction from the front surface part of the main body 110 is defined as a rear surface part. The main body 110 may include a case 111 defining a space in which various parts constituting the robot cleaner 100 are accommodated.

The robot cleaner 100 may include a sensing part 130 that performs detection to obtain the current state information. The sensing part 130 may detect a surrounding situation of the robot cleaner 100 while the robot cleaner 100 travels, and the sensing part 130 may also detect a state of the robot cleaner 100.

The sensing part 130 may detect information about a traveling zone. The sensing part 130 may detect obstacles such as walls, furniture, and cliffs on the driving surface. The sensing part 130 may detect a robot cleaner charging device 200 to be described later. The sensing part 130 may detect information about the ceiling. Through information detected by the sensing part 130, the robot cleaner 100 may map a traveling zone.

The sensing part 130 may include at least one of an obstacle detection sensor 131, a cliff detection sensor 132, an external signal detection sensor (not shown), a shock detection sensor (not shown), an image detection sensor 138, 3D sensors 138*a*, 139*a*, and 139*b*, or a docking detection sensor.

The sensing part 130 may include the obstacle detection sensor 131 for detecting a distance to a surrounding object. The obstacle detection sensor 131 may be disposed on a front part of the body 110 or may be disposed on a side part. The obstacle detection sensor 131 may detect surrounding obstacles. The obstacle detection sensor 131 may be provided in plurality.

Although FIG. 2 shows that the two obstacle detection sensors 131 are provided on the front or side part of the robot cleaner 100, the concept of the present disclosure is not necessarily limited thereto. That is, the obstacle detection sensor 131 may be provided on the front and side parts of the robot cleaner 100, respectively, and the number of the obstacle detection sensors 131 may also not be limited.

For example, the obstacle detection sensor 131 may be an infrared sensor having a light emitter and a light receiver, an ultrasonic sensor, an RF sensor, a geomagnetic sensor, and the like. The obstacle detection sensor 131 may be implemented using ultrasonic waves or infrared rays. The obstacle detection sensor 131 may be implemented using a camera.

The obstacle detection sensor 131 may be implemented with two or more types of sensors.

The obstacle detection sensor 131 may also be referred to as a distance detection sensor 131.

The sensing part 130 may include a cliff detection sensor 132 that detects obstacles on the floor within the traveling area. The cliff detection sensor 132 may detect whether a cliff exists on the floor.

The cliff detection sensor 132 may be provided in plurality and may be disposed on the bottom surface part of the robot cleaner 100.

The cliff detection sensor 132 may be an infrared ray sensor, an ultrasonic sensor, an RF sensor, a Position Sensitive Detector (PSD), or the like, which includes a light emitter and a light receiver. For example, the cliff detection sensor may be a PSD sensor, but may also include a plurality of different types of sensors. The PSD sensor may include a light emitter that emits infrared rays on obstacles and a light receiver that receives infrared rays reflected from obstacles.

The sensing part 130 may include the shock detection sensor for detecting an impact caused by the robot cleaner 100 coming into contact with an external object.

The sensing part 130 may include the external signal detection sensor for detecting a signal emitted from the outside of the robot cleaner 100. The external signal detection sensor may include at least one of an infrared ray sensor for detecting an infrared ray signal from the outside, an ultrasonic sensor for detecting an ultrasonic wave signal from the outside, or a Radio Frequency (RF) Sensor for detecting an RF signal from the outside.

The sensing part 130 may include the image detection sensor 138 for detecting an image of the outside of the robot cleaner 100.

The image detection sensor 138 may include a digital camera. The digital camera may include an image sensor (e.g., CMOS image sensor) including at least one optical lens and a plurality of photodiodes (e.g., pixels) forming an image by light passing through the optical lens, and a digital signal processor (DSP) configuring an image based on signals output from the photodiodes. The DSP may generate not only a still image, but also a moving image including frames configured with still images.

The image detection sensor 138 may include a front image sensor 138a for detecting a forward image of the robot cleaner 100. The front image sensor 138a may detect an image of a nearby object, such as an obstacle or the robot cleaner charging device 200.

The image detection sensor 138 may include an upward image sensor 138b for detecting an upward image of the robot cleaner 100. The upper image sensor 138b may detect an image of a ceiling or a lower surface of furniture disposed above the robot cleaner 100.

The image detection sensor 138 may include a downward image sensor 138c for detecting a downward image of the robot cleaner 100. The downward image sensor 138c may detect an image of the floor.

The image detection sensor 138 may include a sensor for detecting images from the side or the rear.

The sensing part 130 may include the 3D sensors 138a, 139a, and 139b that detect 3D information of an external environment.

The 3D sensors 138a, 139a, and 139b may include a 3D depth camera 138a that calculates a near distance of the robot cleaner 100 and an object to be photographed.

In the present embodiment, the 3D sensors 138a, 139a, and 139b may include a pattern emitter 139 that emits a predetermined pattern of light toward the body 110, and the front image sensor 138a that acquires an image of the front of the body 110. The pattern emitter 139 may include a first pattern emitter 139a for emitting light of a first pattern toward a lower side of the front of the body 110, and a second pattern emitter 139b for emitting light of a second pattern toward an upper side of the front of the body 110. The front image sensor 138a may acquire an image of an area where the light of the first pattern and the light of the second pattern are incident.

The pattern emitter 139 may be provided to emit an infrared ray pattern.

In this case, the front image sensor 138a may measure a distance between the 3D sensor and the object to be photographed by capturing a shape of the infrared ray pattern projected onto the object to be photographed.

The light of the first pattern and the light of the second pattern may be emitted in the form of straight lines intersecting each other. The light of the first pattern and the light of the second pattern may be emitted in the form of horizontal straight lines spaced vertically.

The sensing part 130 may include a docking detection sensor (not shown) that detects whether or not docking of the robot cleaner 100 is successful with respect to the robot cleaner charging device 200. The docking detection sensor may be implemented to be detected by contact between the corresponding terminal 190 and the charging terminal 215 or may be implemented as a detection sensor disposed separately from the corresponding terminal 190, and may be implemented by detecting the charging state of the battery 177 during charging. A docking success state and a docking failure state may be detected by the docking detection sensor.

The robot cleaner 100 may include the battery 177 for supplying driving power to each component. The battery 177 may supply power for the robot cleaner 100 to perform an action according to selected action information. The battery 177 may be mounted on the body 110. The battery 177 may be detachably provided in the body 110.

The battery 177 may be provided to be charged as the robot cleaner 100 is docked with the robot cleaner charging device 200 and the charging terminal 215 and the corresponding terminal 190 are connected. When the charge amount of the battery 177 is equal to or less than a predetermined value, the robot cleaner 100 may start a docking mode for charging. In the docking mode, the robot cleaner 100 may return to the robot cleaner charging device 200.

The robot cleaner 100 may include a traveling part that moves the body 110 with respect to the floor. The traveling part may include at least one driving wheel 166 for moving the body 110 and a driving motor (not shown) for driving the same. The driving wheel 166 may include a left wheel 166 (L) and a right wheel 166 (R) provided on the left and right sides of the body 110, respectively.

The left wheel 166 (L) and the right wheel 166 (R) may be driven by one drive motor, but if necessary, a left wheel drive motor for driving the left wheel 166 (L) and a right wheel driving motor for the right wheel 166 (R) may be provided, respectively. A traveling direction of the body 110 may be switched to the left or right by making a difference between rotation speeds of the left wheel 166 (L) and the right wheel 166 (R).

The traveling part may further include an auxiliary wheel 168 that does not provide a separate driving force but assists the main body with respect to the floor.

The robot cleaner 100 may include a work part that performs a predetermined task. The robot cleaner 100 may move the traveling zone and may clean the floor by the work part. The work part may perform suction of foreign substances and may perform wiping.

The work part may include a suction device for sucking foreign substances, brushes 184 and 185 for sweeping, a dust bin (not shown) for storing foreign substances collected by the suction device or the brush, and/or a mop part (not shown) for performing wiping.

A suction port 180*h* through which air is sucked may be formed on the bottom surface part of the body 110. A suction device (not shown) that provides suction power for sucking air through the suction port 180*h* and a dust bin (not shown) for collecting dust sucked together with air through the suction port 180*h* may be provided inside the body 110.

An opening for insertion and removal of the dust bin may be formed in the case 111, and a dust bin cover 112 that opens and closes the opening may be rotatably provided with respect to the case 111.

The work part may include a roll-type main brush 184 having brushes exposed through the suction port 180*h*, and an auxiliary brush 185 having a plurality of radially extending wings located on the front side of the bottom surface part of the body 110. Dust may be removed from the floor in the traveling area by rotation of these brushes 184 and 185, and dust separated from the floor may be sucked through the suction port 180*h* and collected in the dust bin.

The robot cleaner 100 may include the corresponding terminal 190 for charging the battery 177 when docked with the robot cleaner charging device 200. The corresponding terminal 190 may be disposed at a position accessible to the charging terminal 215 of the robot cleaner charging device 200 in a successful docking state of the robot cleaner 100. In one embodiment, a pair of the corresponding terminals 190 may be disposed on the bottom surface part of the body 110.

The robot cleaner 100 may include an input interface 171 for inputting information. The input interface 171 may receive On/Off or various commands. The input interface 171 may include a button, a key, a touch type display, or the like. The input interface 171 may include a microphone for voice recognition.

The robot cleaner 100 may include an output interface (not shown) for outputting information, a communication interface (not shown) for transmitting and receiving information with other external devices, and a storage (not shown) for storing various information.

The robot cleaner 100 may include a controller (not shown) that processes and determines various information such as mapping and/or recognizing the current location therein, and the controller may control the overall operation of the robot cleaner 100 through control of various components of the robot cleaner 100.

Figure 3:
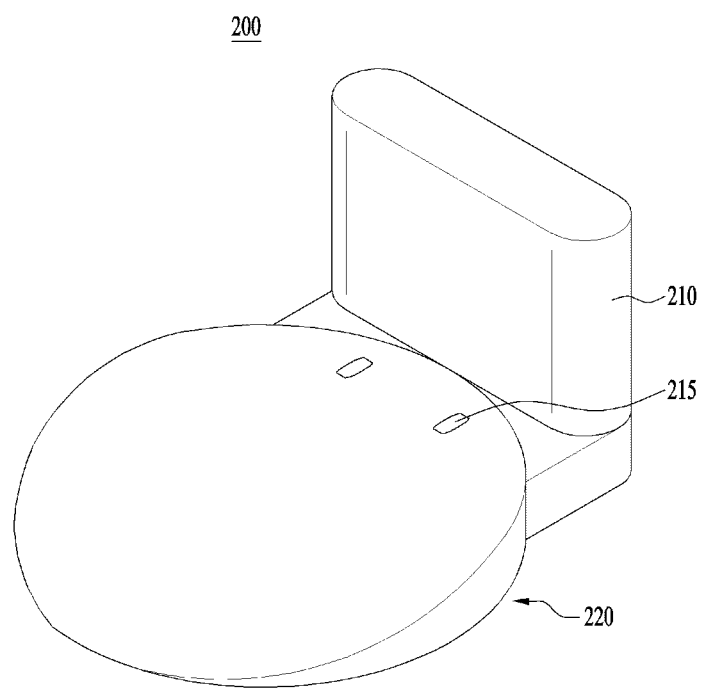
FIG. 3 is a diagram for explaining a robot cleaner charging device according to an embodiment of the present disclosure.

FIG. 3 is a diagram for explaining a robot cleaner charging device according to an embodiment of the present disclosure. In more detail, FIG. 3 is a perspective view for explaining the overall appearance of the robot cleaner charging device.

Referring to FIG. 3, the robot cleaner charging device 200 may be provided to be placed on the floor, and may include the charging terminal 215 provided to be connected to the corresponding terminal 190 in a successful docking state of the robot cleaner 100.

In detail, the robot cleaner charging device 200 may include a main body 210 defining an outer appearance and provided to charge the robot cleaner 100 including the plurality of obstacle detection sensors 131, and the array plate 220 defining a lower part of the main body 210 and having an upper surface on which the charging terminal 215 for charging the robot cleaner 100 is provided.

The main body 210 of the robot cleaner charging device 200 may be made of various materials as needed. In exemplary embodiments, the main body 210 may be made of an opaque material that may be visually blocked from the outside, or may be made of a transparent or translucent material that is visually exposed from the outside.

Various components for charging the robot cleaner 100, for example, a printed circuit board, a sensor, a guide member, etc. may be provided inside the main body 210 of the robot cleaner charging device 200, and a docking confirmation part (not shown) for checking whether the robot cleaner 100 is docked may be further provided.

The array plate 220 of the robot cleaner charging device 200 may have a flat upper surface and may be inclined at a predetermined angle with respect to the ground. In exemplary embodiments, a portion of the array plate 220 adjacent to the main body 210 may have an upper surface higher than a lower surface of the main body 210, and the upper surface of the array plate 220 may be formed to have a constant angle from an adjacent portion to the main body 210 to a portion spaced apart from the main body 210. In one embodiment, a portion of the array plate 220 spaced apart from the main body 210 may partially have the same height as a lower surface of the main body 210.

The shape and material of the array plate 220 are not particularly limited, and the robot cleaner charging device 200 may not include the array plate 220. When the robot cleaner charging device 200 does not include the array plate 220, a separate terminal part (not shown) may be provided below the main body 210 to allow the charging terminal 215 to be disposed.

Figure 4:
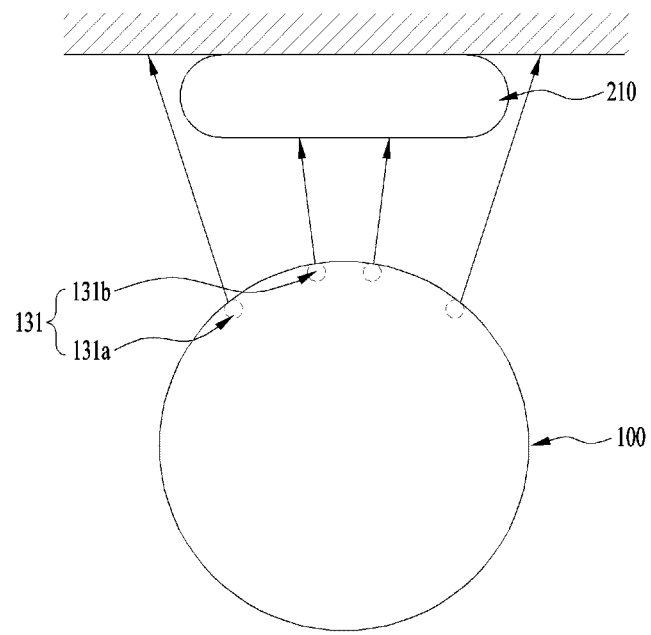
FIGS. 4 and 5 are diagrams for explaining an obstacle detection sensor of a robot cleaner according to exemplary embodiments of the present disclosure.
Figure 5:
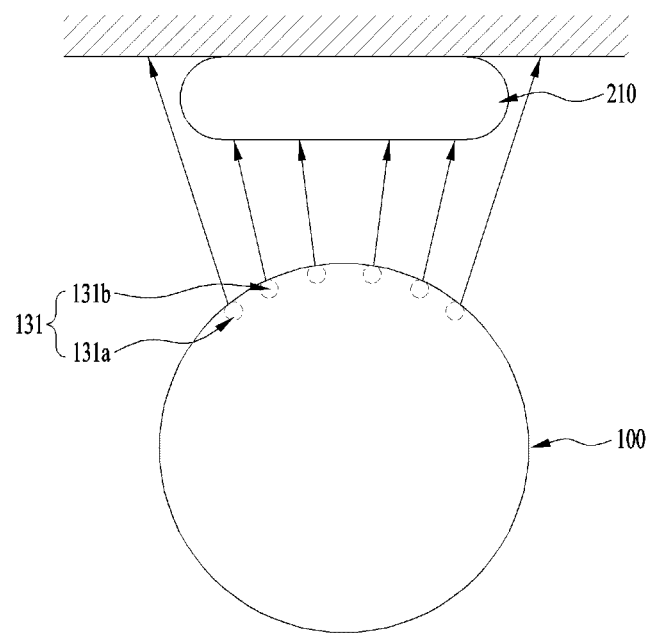

FIGS. 4 and 5 are diagrams for explaining an obstacle detection sensor of a robot cleaner according to exemplary embodiments of the present disclosure.

Referring to FIGS. 4 and 5, the robot cleaner 100 may include a pair of first obstacle detection sensors 131*a* for detecting side obstacles and a second obstacle detection sensor 131*b* disposed between the pair of first obstacle detection sensors 131*a* and provided to detect forward obstacles.

Although FIG. 4 shows the case in which two second obstacle detection sensors 131*b* are formed, and FIG. 5 shows the case in which four second obstacle detection sensors 131*b* are formed, the concept of the pre sent disclosure is not limited thereto. That is, the number of the second obstacle detection sensors 131*b* is not particularly limited, and the number of the first obstacle detection sensors 131*a* is also not particularly limited.

In exemplary embodiments, in a state in which the center line of the robot cleaner 100 and the center line of the robot cleaner charging device 200 are aligned, the second obstacle detection sensors 131*b* may be disposed to detect the main body 210 of the robot cleaner charging device 200, but the first obstacle detection sensors 131*a* may be disposed not to detect the main body 210 of the robot cleaner charging device 200.

In one embodiment, in a state in which the center line of the robot cleaner 100 and the center line of the robot cleaner charging device 200 are aligned, the first obstacle detection sensors 131*a* may be disposed to detect a wall located farther than the main body 210 of the robot cleaner charging device 200.

Hereinafter, a method of aligning the center line of the robot cleaner 100 and the center line of the robot cleaner charging device 200 using the plurality of obstacle detection sensors 131 will be described.

Figure 6:
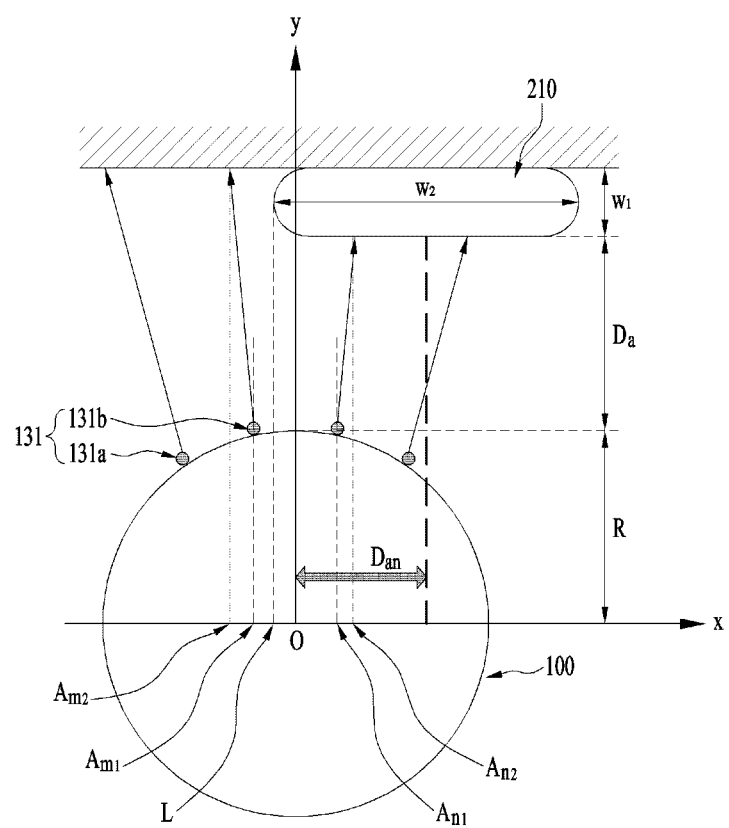
FIGS. 6 and 7 are diagrams for explaining a method of aligning a center line of a robot cleaner according to an embodiment of the present disclosure.

FIG. 6 is a diagram for explaining a method of aligning a center line of a robot cleaner according to an embodiment of the present disclosure. For convenience of description, FIG. 6 illustrates the case in which the robot cleaner 100 includes a total of four obstacle detection sensors 131, more specifically, a pair of the first obstacle detection sensors 131a and a pair of the second obstacle detection sensors 131b, and based thereon, a method of aligning the center line of the robot cleaner 100 and the center line of the robot cleaner charging device 200 will be described.

Referring to FIG. 6, based on the position of one end of the robot cleaner charging device 200 through a two-dimensional Cartesian coordinate system with the center of the robot cleaner 100 as the origin, a center separation distance between the center line of the robot cleaner 100 and the center line of the robot cleaner charging device 200 may be estimated.

In detail, when the robot cleaner 100 approaches the robot cleaner charging device 200 through an IR signal by a first distance Da, for example, a distance of less than 30 cm, the position of one end of the robot cleaner charging device 200 may be estimated using distance measurement values of the obstacle detection sensor 131 that detects the robot cleaner charging device 200 and the obstacle detection sensor 131 that does not detect the robot cleaner charging device 200.

For example, when the robot cleaner 100 is located on the left side from the main body 210 of the robot cleaner charging device 200, that is, the center line of the robot cleaner 100 is located on the left side from the center line of the main body 210, the first obstacle detection sensors 131a and the second obstacle detection sensors 131b disposed on the left side may each detect a wall located behind the main body 210, and the first obstacle detection sensors 131a and the second obstacle detection sensors 131b disposed on the right side may each detect the main body 210. Accordingly, the left end of the main body 210 may be estimated to be located between the second obstacle detection sensors 131b disposed on the left side and the second obstacle detection sensors 131b disposed on the right side.

In exemplary embodiments, when a distance measurement value of the second obstacle detection sensors 131b disposed on the left side is a first measurement distance $D_1$, a separation distance of the second obstacle detection sensors 131b disposed on the left side from the center of the robot cleaner 100 in the x-axis direction is a first mounting distance $Am_1$, and a mounting angle of the second obstacle detection sensors 131b disposed on the left side is a first angle $\theta_1$, the minimum value of a range in which the left end of the main body 210 is to be located may be estimated as a first estimated distance $Am_2$. In this case, the first estimated distance $Am_2$ may be expressed by the following Equation.

$$Am_2 = Am_1 - D_1 \sin \theta_1 \qquad \text{<Equation 1>}$$

Similarly, when a distance measurement value of the second obstacle detection sensors 131b disposed on the right side is a second measurement distance $D_2$, a separation distance of the second obstacle detection sensors 131b disposed on the right side from the center of the robot cleaner 100 in the x-axis direction is a second mounting distance $An_1$, and a mounting angle of the second obstacle detection sensors 131b disposed on the right side is a second angle $\theta_2$, the maximum value of a range in which the left end of the main body 210 is to be located may be estimated as a second estimated distance $An_2$. In this case, the second estimated distance $Am_2$ may be expressed by the following Equation.

$$An_2 = An_1 + D_2 \sin \theta_2 \qquad \text{<Equation 2>}$$

Accordingly, when the x-axis position of the left end of the main body 210 is a first position L, a range of the first position L may be estimated as follows.

$$Am_1 - D_1 \sin \theta_1 < L < An_1 + D_2 \sin \theta_2 \qquad \text{<Equation 3>}$$

Then, when a vertical width of the main body 210 is a first width $W_1$ and a horizontal width of the main body 210 is a second width $W_2$, the center of the robot cleaner 100 is the origin, and thus the x-axis position of the center line of the main body 210 may be a center separation distance Dan between the robot cleaner 100 and the robot cleaner charging device 200, and the center separation distance Dan may be estimated as follows.

$$Dan = L + W_2/2 \qquad \text{<Equation 4>}$$

That is, as a result, the center separation distance between the robot cleaner 100 and the robot cleaner charging device 200 may be expressed as an x-axis position difference between the center of the robot cleaner 100 and the center of the robot cleaner charging device 200.

Although not shown, a method for estimating the center separation distance between the robot cleaner 100 and the robot cleaner charging device 200 through Equations 1 to 4 above may be applied in substantially the same or similar way when the robot cleaner 100 is located on the right side of the main body 210, that is, when the center line of the robot cleaner 100 is located on the right side from the center line of the main body 210.

In exemplary embodiments, when an absolute value of the center separation distance Dan is smaller than a specific value, the center lines of the robot cleaner 100 and the robot cleaner charging device 200 may be determined to be aligned, and when an absolute value of the center separation distance Dan is greater than the specific value, the center liens of the robot cleaner 100 and the robot cleaner charging device 200 may not be determined to be aligned. In one embodiment, the specific value may be about 5 cm.

In exemplary embodiments, when a value of the center separation distance Dan is positive, the robot cleaner 100 may be determined to be located on the left side from the center line of the robot cleaner charging device 200, and when a value of the center separation distance Dan is negative, the robot cleaner 100 may be determined to be located on the located on the right side from the center line of the robot cleaner charging device 200.

Figure 7:
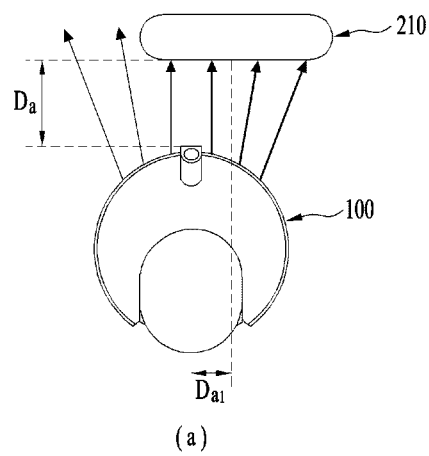
Figure 7:
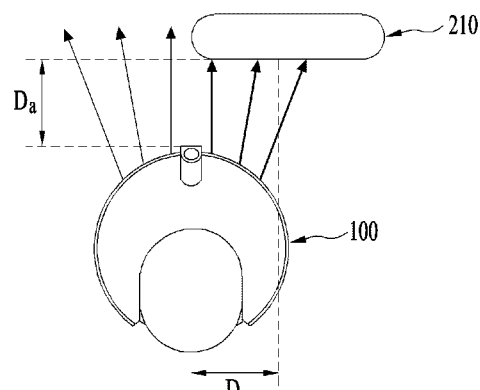
Figure 7:
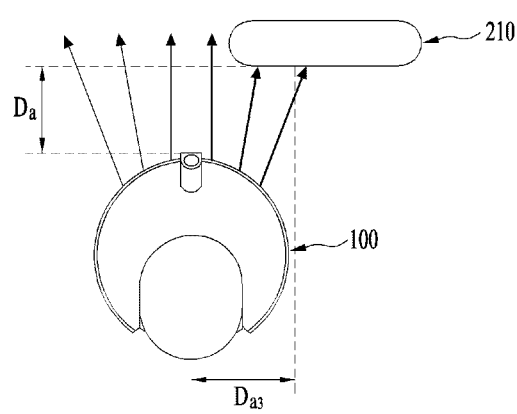

FIG. 7 is a diagram for explaining a state in which a center line of a robot cleaner is not aligned according to an embodiment of the present disclosure.

Referring to FIGS. 7(a) to 7(b), when the robot cleaner 100 approaches the robot cleaner charging device 200 by the first distance Da through an IR signal, whether the center line of the robot cleaner 100 and the robot cleaner charging device 200 are aligned may be determined according to whether the plurality of obstacle detection sensors 131 detect the robot cleaner charging device 200. In this case, the plurality of obstacle detection sensors 131 may include a pair of the first obstacle detection sensors 131a for detecting side obstacles, and the second obstacle detection sensors 131b disposed between the pair of first obstacle detection sensors 131a and provided to detect side obstacles, and the second obstacle detection sensors 131b may be provided in a total of four.

In exemplary embodiments, as shown in FIG. 5, the robot cleaner 100 may determine a state in which only the second obstacle detection sensor 131b of the plurality of obstacle detection sensors 131 detects the robot cleaner charging device as a state in which the center lines of the robot cleaner 100 and the robot cleaner charging device 200 are aligned.

In contrast, as shown in FIGS. 7(a) to 7(b), the robot cleaner 100 may determine a state in which at least one of the pair of first obstacle detection sensors 131a detects the robot cleaner charging device 200 as a state in which the center lines of the robot cleaner 100 and the robot cleaner charging device 200 are not aligned.

For example, the robot cleaner 100 may determine a state in which only the first obstacle detection sensor 131a disposed on the right among the pair of first obstacle detection sensors 131a detects the robot cleaner charging device 200 as a state in which the center line of the robot cleaner 100 is spaced apart from the center line of the robot cleaner charging device 200 to the left side. In this case, the robot cleaner 100 may move to the right side to align the center line of the robot cleaner 100 and the center line of the robot cleaner charging device 200.

Similarly, the robot cleaner 100 may determine a state in which only the first obstacle detection sensor 131a disposed on the left among the pair of first obstacle detection sensors 131a detects the robot cleaner charging device 200 as a state in which the center of the robot cleaner 100 is spaced apart from the center line of the robot cleaner charging device 200 to the right side. In this case, the robot cleaner 100 may move to the left side to align the center lines of the robot cleaner 100 and the robot cleaner charging device 200.

In this case, the robot cleaner 100 may be controlled to move to the right or left side by the aforementioned center separation distance Dan.

FIG. 7(a) shows that the center line of the robot cleaner 100 is separated from the center line of the main body 210 of the robot cleaner charging device to the left by a first center separation distance $Da_1$, FIG. 7(b) shows that the center line of the robot cleaner 100 is separated from the center line of the main body 210 of the robot cleaner charging device by a second center separation distance $Da_2$ that is greater than the first center separation distance $Da_1$, and FIG. 7(c) shows that the center line of the robot cleaner 100 is separated from the center of the main body 210 of the robot cleaner charging device by a third center separation distance $Da_3$ that is greater than the second center separation distance $Da_2$. In this case, the center separation distance Dan between the robot cleaner 100 and the robot cleaner charging device 200 may be indirectly estimated by comparing which sensor detects the robot cleaner charging device 200 among the obstacle detection sensors 131 in addition to the above-described estimation method using Equations 1 to 4 above.

For example, as shown in FIG. 7(a), the robot cleaner 100 may determine a state in which the leftmost obstacle detection sensor and an obstacle detection sensor adjacent thereto among the plurality of obstacle detection sensors 131 do not detect the main body 210 and the other obstacle detection sensors detect the main body 210 as a state in which the center line of the robot cleaner 100 is spaced apart from the center line of the main body 210 of the robot cleaner charging device to the left by a first center separation distance $Da_1$.

For example, as shown in FIG. 7(b), the robot cleaner 100 may determine a state in which obstacle detection sensors disposed on the left among the plurality of obstacle detection sensors 131 do not detect the main body 210 and obstacle detection sensors disposed on the right detect the main body 210 as a state in which the center line of the robot cleaner 100 is spaced apart from the center line of the main body 210 of the robot cleaner charging device to the left by a second center separation distance $Da_2$.

For example, as shown in FIG. 7(c), the robot cleaner 100 may determine a state in which the rightmost obstacle detection sensor and an obstacle detection sensor adjacent thereto among the plurality of obstacle detection sensors 131 detect the main body 210 and the other obstacle detection sensors do not detect the main body 210 as a state in which the center line of the robot cleaner 100 is spaced apart from the center line of the main body 210 of the robot cleaner charging device to the left by a third center separation distance $Da_3$.

Hereinafter, a method of correcting a direction angle between the robot cleaner 100 and the robot cleaner charging device 200 using the plurality of obstacle detection sensors 131 will be described.

Figure 8:
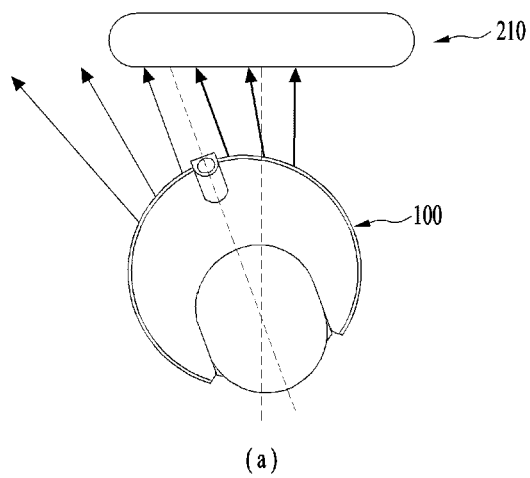
FIGS. 8 and 9 are diagrams for explaining a method of correcting a direction angle of a robot cleaner according to an embodiment of the present disclosure.
Figure 8:
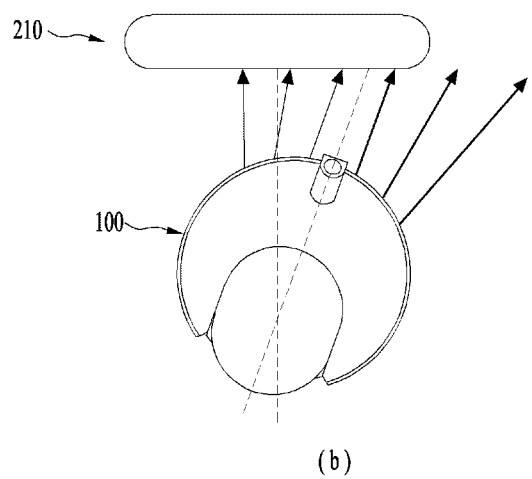
Figure 9:
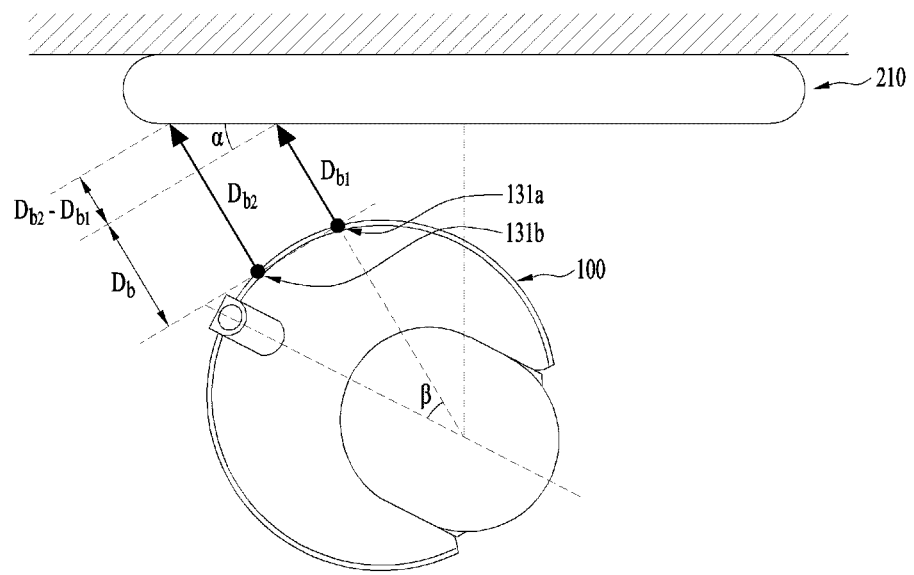

FIGS. 8 and 9 are diagrams for explaining a method of correcting a direction angle of a robot cleaner according to an embodiment of the present disclosure.

Referring to FIGS. 8(a) and 8(b), the robot cleaner 100 may check whether the shortest distance between the robot cleaner 100 and the robot cleaner charging device 200 is equal to or less than a second distance Db smaller than the first distance Da in a state in which the center lines of the robot cleaner 100 and the robot cleaner charging device 200 are aligned, may then check whether a difference in direction angle occurs between the robot cleaner 100 and the robot cleaner charging device 200 through the plurality of obstacle detection sensors 131, and may correct the difference in the direction angle. In one embodiment, the second distance Db may be about 15 cm.

In this case, whether a difference in direction angle occurs between the robot cleaner 100 and the robot cleaner charging device 200 may be determined according to whether at least one of the pair of first obstacle detection sensors 131a detects the robot cleaner charging device 200.

For example, as shown in FIG. 8(a), the robot cleaner 100 may determine a state in which only the first obstacle detection sensor 131a disposed on the right among the pair of first obstacle detection sensors 131a detects the main body 210 of the robot cleaner charging device as a state in which a difference in direction angle in a counterclockwise direction occurs between the robot cleaner 100 and the center line of the robot cleaner charging device 200 by a specific angle. In this case, the robot cleaner 100 may rotate in a clockwise direction to correct the difference in direction angle between the robot cleaner 100 and the robot cleaner charging device 200.

In contrast, as shown in FIG. 8(b), the robot cleaner 100 may determine a state in which only the first obstacle detection sensor 131a disposed on the left among the pair of first obstacle detection sensors 131a detects the main body 210 of the robot cleaner charging device as a state in which a difference in direction angle in a clockwise direction occurs between the robot cleaner 100 and the center line of the robot cleaner charging device 200 by a specific angle. In this case, the robot cleaner 100 may rotate in a counterclockwise direction to correct the difference indirection angle between the robot cleaner 100 and the robot cleaner charging device 200.

Referring to FIG. 9, the difference in direction angle between the robot cleaner 100 and the robot cleaner charging device 200 may be determined using the smallest distance measurement value and a distance measurement value closest thereto among distance measurement values of the obstacle detection sensors 131 that detect the position of the robot cleaner charging device 200.

In detail, when the smallest distance measurement value among distance measurement values of the obstacle detection sensor 131 that detects the position of the main body 210 of the robot cleaner charging device is a third measurement distance $Db_1$ and a distance measurement value adjacent thereto is a fourth measurement distance $Db_2$, a first direction angle between the obstacle detection sensors 131 that detects the position of the main body 210 of the robot cleaner charging device and the main body 210 of the robot cleaner charging device may be estimated as follows.

$$\alpha = \tan^{-1}(|Db_1 - Db_2|/\text{distance between obstacle detection sensors}) \quad \text{<Equation 5>}$$

Then, when a placement angle of the obstacle detection sensor 131 that detects the position of the main body 210 of the robot cleaner charging device is a second direction angle $\beta$, a difference in the total direction angle between the robot cleaner 100 and the main body 210 of the robot cleaner charging device may be estimated as the sum of the first direction angle $\alpha$ and the second direction angle $\beta$.

Accordingly, the robot cleaner 100 may rotate in a clockwise or counterclockwise direction by an angle corresponding to the sum of the total direction angles, that is, the first direction angle $\alpha$ and the second direction angle $\beta$ to correct the difference in direction angle between the robot cleaner 100 and the robot cleaner charging device 200.

Although FIG. 9 shows that an obstacle detection sensor having the closest distance measurement value is the first obstacle detection sensors 131*a* and an obstacle detection sensor having a distance measurement value closest thereto is the second obstacle detection sensors 131*b*, the concept of the present disclosure is not necessarily limited thereto. That is, all obstacle detection sensors having the closest distance measurement value and the distance measurement value closest thereto may also be the second obstacle detection sensor 131*b*.

Figure 10:
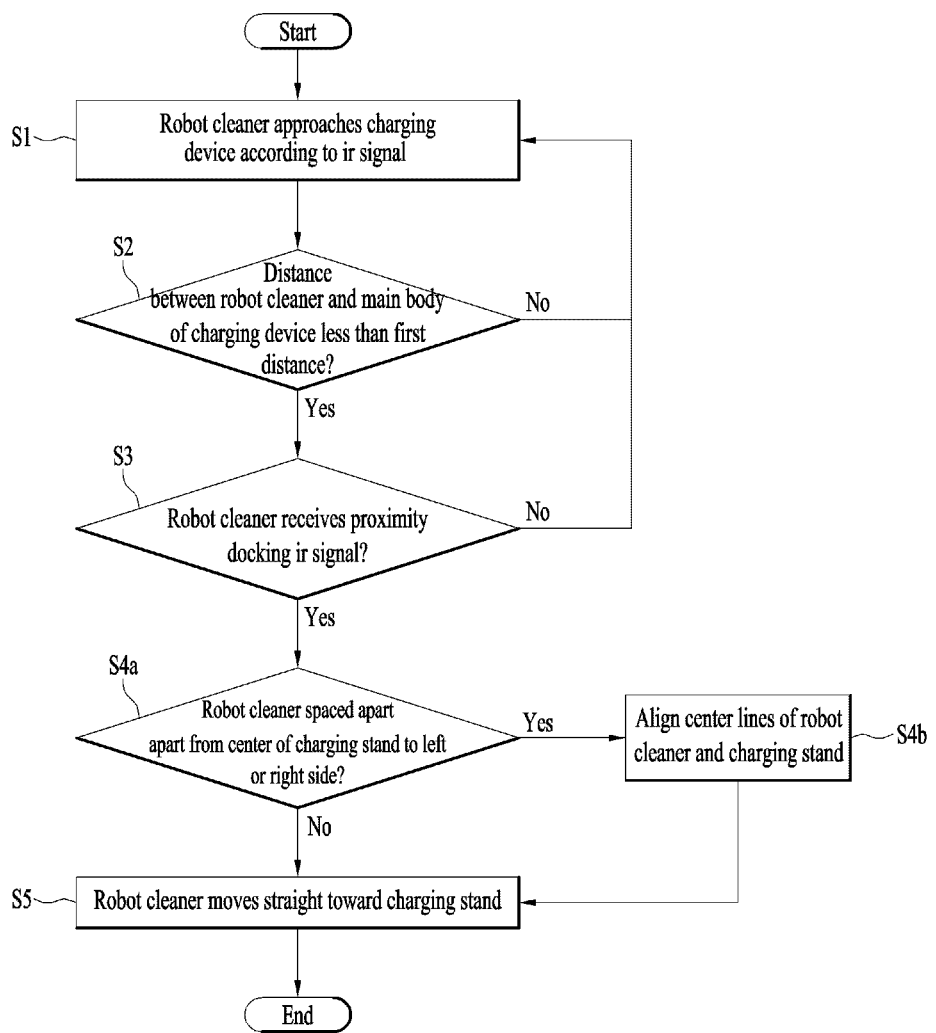
FIG. 10 is a flowchart for explaining a method of aligning a center line of a robot cleaner according to an embodiment of the present disclosure.

FIG. 10 is a flowchart for explaining a method of aligning a center line of a robot cleaner according to an embodiment of the present disclosure.

Referring to FIG. 10, a control method of a robot cleaner according to the present disclosure may include a first operation S1 in which the robot cleaner 100 approaches the robot cleaner charging device 200 through an IR signal, a second operation S2 of checking whether a distance between the robot cleaner 100 and the robot cleaner charging device 200 is less than a first distance D1, a third operation S3 of checking whether the robot cleaner 100 receives a proximity docking IR signal generated from the robot cleaner charging device 200, a fourth operation S4 of checking whether the center lines of the robot cleaner 100 and the robot cleaner charging device 200 are aligned through the obstacle detection sensor 131 (S4*a*) and aligning the center lines (S4*b*), and a fifth operation S5 in which the robot cleaner 100 moves straight toward the robot cleaner charging device 200 when the center lines of the robot cleaner 100 and the robot cleaner charging device 200 are aligned.

In this case, the fourth operation S4 may be performed through the center line alignment method of the robot cleaner 100 described with reference to FIGS. 6 and 7.

The first operation S1 may be referred to as a remote docking operation, and the second operation S2 to the fifth operation S5 may be referred to as a center line alignment operation.

In exemplary embodiments, the first distance D1 may be about 30 cm.

Figure 11:
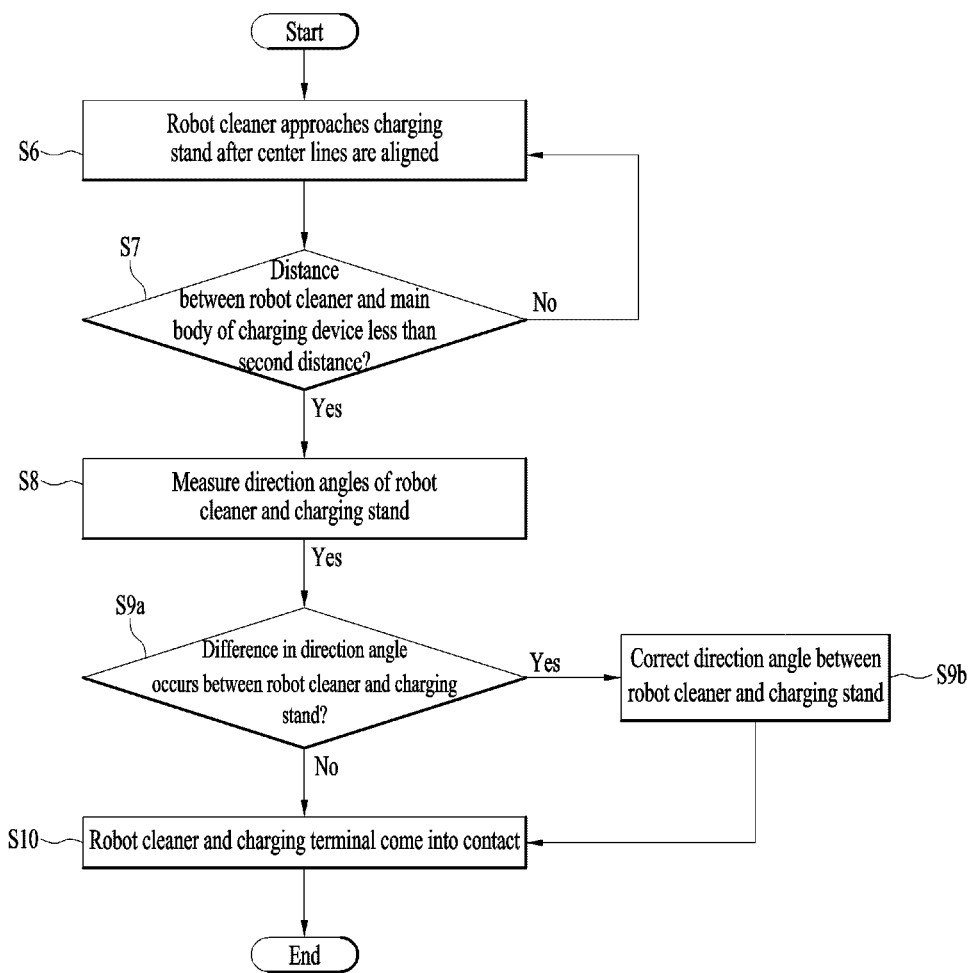
FIG. 11 is a flowchart for explaining a method of correcting a direction angle of a robot cleaner according to an embodiment of the present disclosure.

FIG. 11 is a flowchart for explaining a method of correcting a direction angle of a robot cleaner according to an embodiment of the present disclosure.

Referring to FIG. 11, a control method of a robot cleaner according to the present disclosure may further include a sixth operation S6 in which the robot cleaner 100 approaches the robot cleaner charging device 200 after the center line alignment operation, a seventh operation S7 of checking whether a distance between the robot cleaner 100 and the robot cleaner charging device 200 is less than a second distance D2 that is smaller than the first distance D1, an eighth operation S8 of measuring a distance between the robot cleaner 100 and the robot cleaner charging device 200 through the obstacle detection sensor 131, a ninth operation S9 of checking whether a difference in direction angle occurs between the robot cleaner 100 and the robot cleaner charging device 200 through the obstacle detection sensor 131 (S9*a*) and correcting the direction angle difference (S9*b*), and a tenth operation S10 in which the robot cleaner 100 and the charging terminal 215 come into contact when the direction angles of the robot cleaner 100 and the robot cleaner charging device 200 are corrected.

In this case, the eighth operation S8 and the ninth operation S9 may be performed through the center line alignment method of the robot cleaner 100 described with reference to FIGS. 6 and 7.

The sixth operation S6 to the tenth operation S10 may be referred to as a direction angle correction operation, and the second operation S2 to the tenth operation S10 may be referred to as a short-distance docking operation together.

In exemplary embodiments, the second distance D1 may be about 15 cm.

As described above, the remote docking operation of the robot cleaner 100 may be performed according to the IR signal generated from the robot cleaner charging device 200, and the short-distance docking operation of the robot cleaner 100 may be performed by estimating the position of the robot cleaner charging device 200 through the obstacle detection sensor 131.

In this case, docking in a state in which the robot cleaner 100 is in close proximity to the robot cleaner charging device 200 may not be performed according to an IR signal, and thus may not be affected by external environments, such as indoor lighting and sunlight, and a disadvantage that it is difficult to distinguish a specific area of the robot cleaner charging device 200 according to the maximum intensity of the IR signal may be overcome. Accordingly, short-distance docking for charging the robot cleaner 100 and the robot cleaner charging device 200 may be precisely performed.

Although various embodiments of the present disclosure have been described in detail above, those of ordinary skill in the art to which the present disclosure pertains will understand that it is possible to make various modifications to the above-described embodiments without departing from the scope of the present disclosure. Therefore, the scope of the present disclosure should not be limited to the described embodiments, and should be defined by the claims described below as well as the claims and equivalents.

The invention claimed is:

1. A control method of a robot cleaner, the method comprising:
 a first operation in which the robot cleaner including a plurality of obstacle detection sensors approaches a robot cleaner charging device according to an IR signal transmitted from the robot cleaner charging device including a charging terminal for charging the robot cleaner;

a second operation of checking whether a shortest distance between the robot cleaner and the robot cleaner charging device is equal to or less than a first distance through the plurality of obstacle detection sensors;

a third operation of checking whether center lines of the robot cleaner and the robot cleaner charging device are aligned through the plurality of obstacle detection sensors and aligning the center lines of the robot cleaner and the robot cleaner charging device;

a fourth operation in which the robot cleaner moves straight toward the robot cleaner charging device when the center lines of the robot cleaner and the robot cleaner charging device are aligned;

a fifth operation of checking whether the shortest distance between the robot cleaner and the robot cleaner charging device is equal to or less than a second distance smaller than the first distance in a state in which the center lines of the robot cleaner and the robot cleaner charging device are aligned;

a sixth operation of checking whether a difference in direction angle occurs between the robot cleaner and the robot cleaner charging device through the plurality of obstacle detection sensors and correcting the difference in the direction angle between the robot cleaner and the robot cleaner charging device; and a seventh operation in which the robot cleaner and the charging terminal come into contact when direction angles of the robot cleaner and the robot cleaner charging device are corrected.

2. The method of claim 1, wherein, in the third operation, when a distance measurement value of a first obstacle detection sensor of the plurality of obstacle detection sensors is greater than a distance measurement value of a second obstacle detection sensor of the plurality of obstacle detection sensors that detects a position of the robot cleaner charging device, one end of the robot cleaner charging device is determined to be located between the plurality of obstacle detection sensors, and a center separation distance between the center line of the robot cleaner and the center line of the robot cleaner charging device is estimated based on a position of the one end of the robot cleaner charging device through a 2D Cartesian coordinate system using a center of the robot cleaner as an origin.

3. The method of claim 2, wherein, in the third operation, when an absolute value of the center separation distance is smaller than a specific value, the center lines of the robot cleaner and the robot cleaner charging device are determined to be aligned, and when the absolute value of the center separation distance is greater than the specific value, the center lines of the robot cleaner and the robot cleaner charging device are determined not to be aligned.

4. The method of claim 3, wherein, in the third operation, when a value of the center separation distance is a positive value, the robot cleaner is determined to be located to a left from the center line of the robot cleaner charging device, and when the value of the center separation distance is a negative value, the robot cleaner is determined to be located to a right from the center line of the robot cleaner charging device.

5. The method of claim 1, wherein the plurality of obstacle detection sensors include a pair of first obstacle detection sensors for detecting a side obstacle, and a second obstacle detection sensor disposed between the pair of first obstacle detection sensors and provided to detect a forward obstacle, and wherein, in the third operation, whether the center lines of the robot cleaner and the robot cleaner charging device are aligned is determined according to whether the first obstacle detection sensor and the second obstacle detection sensor detect the robot cleaner charging device.

6. The method of claim 5, wherein, in the third operation, a state in which only the second obstacle detection sensor among the plurality of obstacle detection sensors detects the robot cleaner charging device is determined as a state in which the center lines of the robot cleaner and the robot cleaner charging device are aligned.

7. The method of claim 6, wherein, in the third operation, a state in which at least one first obstacle detection sensor among the pair of first obstacle detection sensors detects the robot cleaner charging device is determined as a state in which the enter lines of the robot cleaner and the robot cleaner charging device are determined not to be aligned.

8. The method of claim 7, wherein, in the third operation, a state in which only the first obstacle detection sensor disposed on a right among the pair of first obstacle detection sensors detects the robot cleaner charging device is determined as a state in which the center line of the robot cleaner is spaced apart from the center line of the robot cleaner charging device to a left.

9. The method of claim 8, wherein, in the third operation, when the center line of the robot cleaner is determined to be spaced apart from the center line of the robot cleaner charging device to the left, the robot cleaner moves to a right.

10. The method of claim 7, wherein, in the third operation, a state in which only the first obstacle detection sensor disposed on a left among the pair of first obstacle detection sensors detects the robot cleaner charging device is determined as a state in which the center line of the robot cleaner is spaced apart from the center line of the robot cleaner charging device to a right.

11. The method of claim 10, wherein, in the third operation, when the center line of the robot cleaner is determined to be spaced apart from the center line of the robot cleaner charging device to the right, the robot cleaner moves to a left.

12. The method of claim 1, wherein, in the sixth operation, whether the difference in direction angle occurs between the robot cleaner and the robot cleaner charging device is determined using a smallest distance measurement value among distance measurement values measured by the plurality of obstacle detection sensors that detect a position of the robot cleaner charging device and a distance measurement value, measured by the remaining obstacle detection sensors of the plurality of obstacle detection sensors, closest to the smallest distance measurement value.

13. The method of claim 1, wherein the plurality of obstacle detection sensors include a pair of first obstacle detection sensors for detecting a side obstacle, and a second obstacle detection sensor disposed between the pair of first obstacle detection sensors and provided to detect a forward obstacle, and wherein, in the sixth operation, whether the difference in direction angle occurs between the robot cleaner and the robot cleaner charging device is determined according to whether at least one of the pair of first obstacle detection sensors detects the robot cleaner charging device.

14. The method of claim 13, wherein, in the sixth operation, a state in which only the first obstacle detection sensor disposed on a right among the pair of first obstacle detection sensors detects the robot cleaner charging device is determined as a state in which the difference in direction angle in a counterclockwise direction occurs between the robot cleaner and the center line of the robot cleaner charging device by a specific angle.

15. The method of claim 14, wherein, in the sixth operation, when the difference in direction angle in the counterclockwise direction is determined to occur between the robot cleaner and the center line of the robot cleaner charging device by the specific angle, the robot cleaner rotates in a clockwise direction to correct the difference in direction angle.

16. The method of claim 13, wherein, in the sixth operation, only the first obstacle detection sensor disposed to a left among the pair of first obstacle detection sensors detects the robot cleaner charging device is determined as a state in which the difference in direction angle in a clockwise direction occurs between the robot cleaner and the center line of the robot cleaner charging device by a specific angle.

17. The method of claim 16, wherein, in the sixth operation, when the difference in direction angle in the clockwise direction is determined to occur between the robot cleaner and the center line of the robot cleaner charging device by the specific angle, the robot cleaner rotates in a counterclockwise direction to correct the difference in direction angle.

* * * * *